US008733595B2

(12) United States Patent
Anselmino et al.

(10) Patent No.: US 8,733,595 B2
(45) Date of Patent: May 27, 2014

(54) REFRIGERATOR WITH BEVERAGE DISPENSER CLEANING SYSTEM

(75) Inventors: Philip A. Anselmino, Saint Joseph, MI (US); Kevin M. Chase, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 540 days.

(21) Appl. No.: 12/915,187

(22) Filed: Oct. 29, 2010

(65) Prior Publication Data

US 2012/0104024 A1 May 3, 2012

(51) Int. Cl.

| | |
|---|---|
| ***B67D 1/08*** | (2006.01) |
| ***B67D 7/78*** | (2010.01) |
| ***B67D 7/80*** | (2010.01) |
| ***A23L 3/36*** | (2006.01) |

(52) U.S. Cl.
USPC ..................... 222/148; 222/145.2; 222/145.5; 222/146.6; 222/1; 62/303; 62/390; 62/441

(58) Field of Classification Search
USPC .................... 222/148, 145.2, 145.5, 146.6, 1; 62/303, 390, 441
See application file for complete search history.

(56) References Cited

U.S. PATENT DOCUMENTS

| | | | | | |
|---|---|---|---|---|---|
| 3,687,050 | A | * | 8/1972 | Wilke | 396/630 |
| 3,898,861 | A | * | 8/1975 | McMillin | 62/177 |
| 4,527,585 | A | * | 7/1985 | Mirabile | 137/240 |
| 4,572,230 | A | * | 2/1986 | Mirabile | 137/240 |
| 4,753,372 | A | * | 6/1988 | Pocock et al. | 222/148 |
| 4,958,666 | A | * | 9/1990 | Kocourek et al. | 141/114 |
| 5,086,800 | A | * | 2/1992 | Dunn | 137/1 |
| 5,090,440 | A | * | 2/1992 | Ladouceur et al. | 137/209 |
| 5,603,432 | A | | 2/1997 | Sardynski et al. | |
| 5,871,068 | A | * | 2/1999 | Selby | 184/1.5 |
| 6,374,872 | B1 | * | 4/2002 | Tarabocchia | 141/98 |
| 6,378,657 | B2 | * | 4/2002 | Viken | 184/1.5 |
| 6,669,051 | B1 | | 12/2003 | Phallen et al. | |
| 6,821,480 | B2 | | 11/2004 | Suddath et al. | |
| 6,915,926 | B2 | * | 7/2005 | Naik | 222/146.6 |
| 7,278,552 | B2 | | 10/2007 | Crisp, III | |
| 7,293,675 | B1 | * | 11/2007 | Luhn | 222/148 |
| 7,331,483 | B2 | | 2/2008 | Bhimani et al. | |
| 7,347,345 | B2 | | 3/2008 | Guerrero et al. | |
| 7,401,613 | B2 | | 7/2008 | Carhuff et al. | |
| 7,448,314 | B2 | | 11/2008 | Ioannone et al. | |
| 7,472,805 | B2 | | 1/2009 | Nighy | |
| 7,562,793 | B2 | | 7/2009 | Ufheil et al. | |
| 8,079,230 | B2 | * | 12/2011 | Frank et al. | 62/303 |
| 8,181,824 | B2 | * | 5/2012 | Ziesel et al. | 222/129.4 |
| 2009/0014464 | A1 | | 1/2009 | Adbelmoteleb et al. | |
| 2009/0057341 | A1 | | 3/2009 | Girard et al. | |

FOREIGN PATENT DOCUMENTS

| | | | |
|---|---|---|---|
| EP | 1688388 | A1 | 1/2006 |
| EP | 1688389 | A1 | 1/2006 |
| WO | 2006/090183 | A2 | 8/2006 |
| WO | 2009/012011 | A2 | 1/2009 |

* cited by examiner

*Primary Examiner* — Frederick C Nicolas
*Assistant Examiner* — Nicholas J Weiss

(57) ABSTRACT

A refrigerator is provided which includes a cabinet. A first compartment and second compartment are disposed within the cabinet. A first door provides access to the first compartment and a second door provides access to the second compartment. A beverage dispensing system is disposed within the cabinet. The beverage dispensing system has a fluid line, a fluid enhancement line, and a cleaning subsystem for cleaning the fluid component line and the fluid enhancement line.

8 Claims, 8 Drawing Sheets

REFRIGERATOR WITH BEVERAGE DISPENSER CLEANING SYSTEM

FIELD OF THE INVENTION

The present invention generally relates to a beverage dispenser. More particularly, but not exclusively, the present invention relates to a refrigerator beverage dispenser having a cleaning subsystem.

BACKGROUND OF THE INVENTION

The background of the invention is discussed in the context of a beverage dispenser used in a refrigerator. The present invention is not to be limited to this specific context. Refrigerators have long been used to dispense fluid such as water. More recently it has been desirous to provide refrigerators with beverage dispensers. One of the problems of dispensing beverages from a refrigerator relates to keeping the beverage dispensing system clean. Failure to keep a beverage dispensing system clean may adversely affect its use. In addition failure to clean may lend to flavor contamination. Yet users may not be willing to take the steps necessary to properly clean a beverage dispenser.

What is needed is an apparatus and method for a refrigerator with a beverage dispensing system which is easy and convenient to clean.

BRIEF SUMMARY OF THE INVENTION

Therefore it is a primary, object, feature, or advantage of the present invention to improve over the state of the art.

It is a further object, feature, or advantage of the present invention to provide a refrigerator with a beverage dispensing system capable of self-cleaning.

Another object, feature, or advantage of the present invention is to provide a refrigerator with a beverage dispensing system which is easy and convenient for a user to operate.

One or more of these and/or other objects, features, or advantages of the present invention will become clear from the specification and claims that follow. No single embodiment need exhibit each and every object, feature, or advantage.

A still further object, feature, or advantage of the present invention is to assist in preventing flavor contamination.

According to one aspect of the present invention a refrigerator is provided which includes a cabinet. A first compartment and second compartment are disposed within the cabinet. A first door provides access to the first compartment and a second door provides access to the second compartment. A beverage dispensing system is operatively connected to the cabinet. The beverage dispensing system has a fluid line, a fluid enhancement line, and a cleaning subsystem for cleaning the fluid enhancement line and the fluid line.

According to another aspect of the present invention a refrigerator has a cabinet with a first compartment and a second compartment disposed within the cabinet. A first door provides access to the first compartment and a second door provides access to the second compartment. A beverage dispensing system is disposed within the cabinet. The beverage dispensing system has fluid lines, syrup or powder lines, and a cleaning subsystem for cleaning out the fluid lines and syrup or powder lines.

According to another aspect of the present invention a method of using a refrigerator with a beverage dispensing system is provided The method includes providing a refrigerator having a refrigerator cabinet and a beverage dispenser operatively connected to the refrigerator cabinet. The method further includes receiving an indicia from a user to dispense a beverage. The method further includes dispensing the beverage and circulating a cleaning fluid through the fluid line or the fluid enhancement line for cleaning after dispensing.

DETAILED DESCRIPTION OF THE PREFERRED EMBODIMENT

Figure 1:
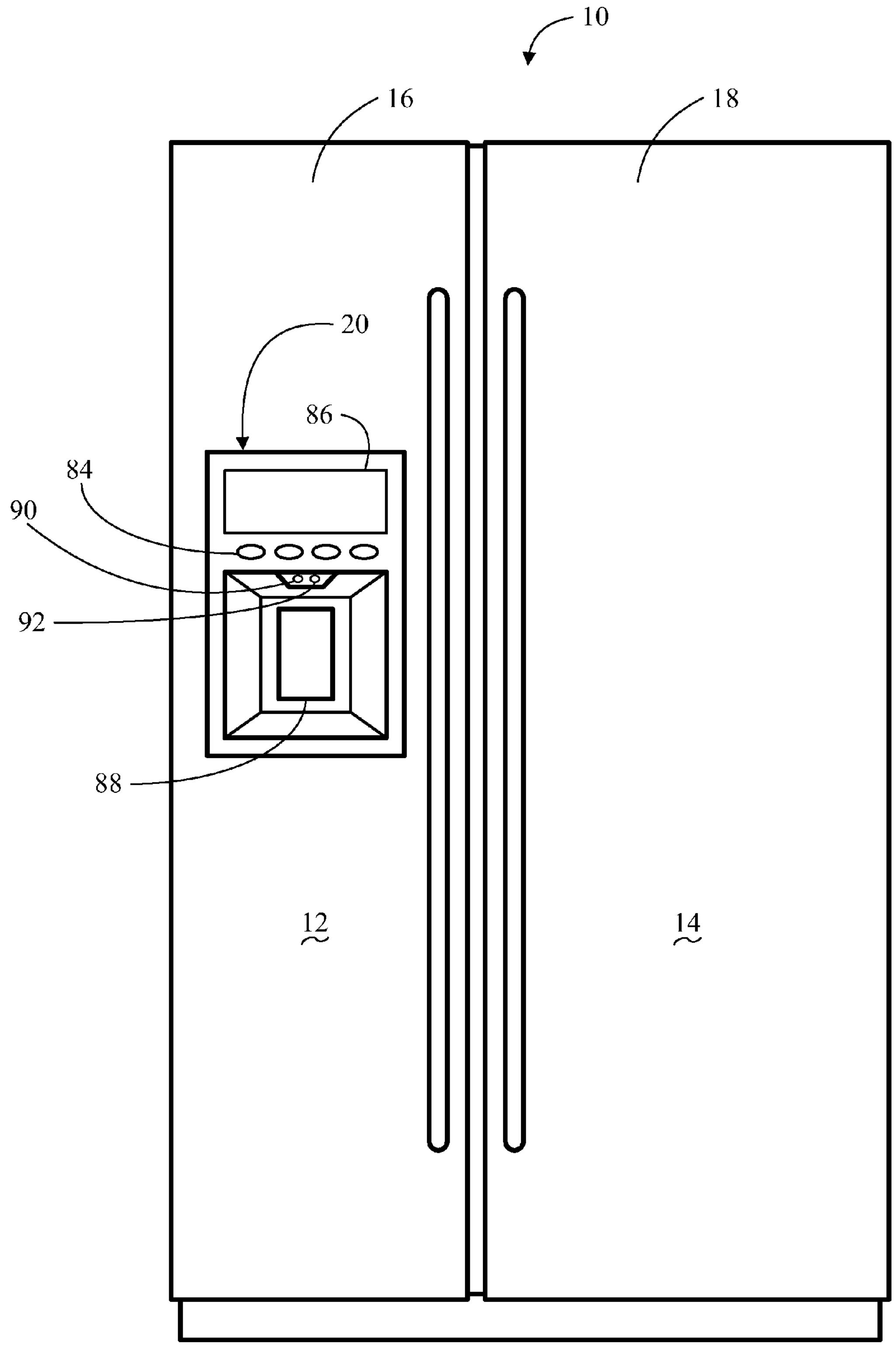
FIG. 1 is a front elevation view of a refrigerator with a beverage dispenser.

FIG. 1 illustrates a refrigerator 10 having a fresh food compartment 14 and a freezer compartment 12. A fresh food compartment door 18 provides access to the fresh food compartment 14. The freezer compartment door 16 provides access to the freezer compartment 12. The refrigerator 10 includes a beverage dispensing system 20 which is shown at the door 16. The beverage dispenser 20 may include a user interface with control buttons 84 which enable a user to select a preferred dispensing operation. Of course, other types of user interfaces may be provided. A first nozzle 90 in the dispenser 20 may deliver a flow of fluid downward. A second nozzle 92 adjacent the first nozzle 90 in the dispenser 20 may also deliver a flow of enhanced fluid downward. In FIG. 1, the refrigerator 10 is shown in a side-by-side configuration. Of course, the refrigerator 10 may take on other configurations as well, such as a bottom mount freezer configuration.

Figure 2:
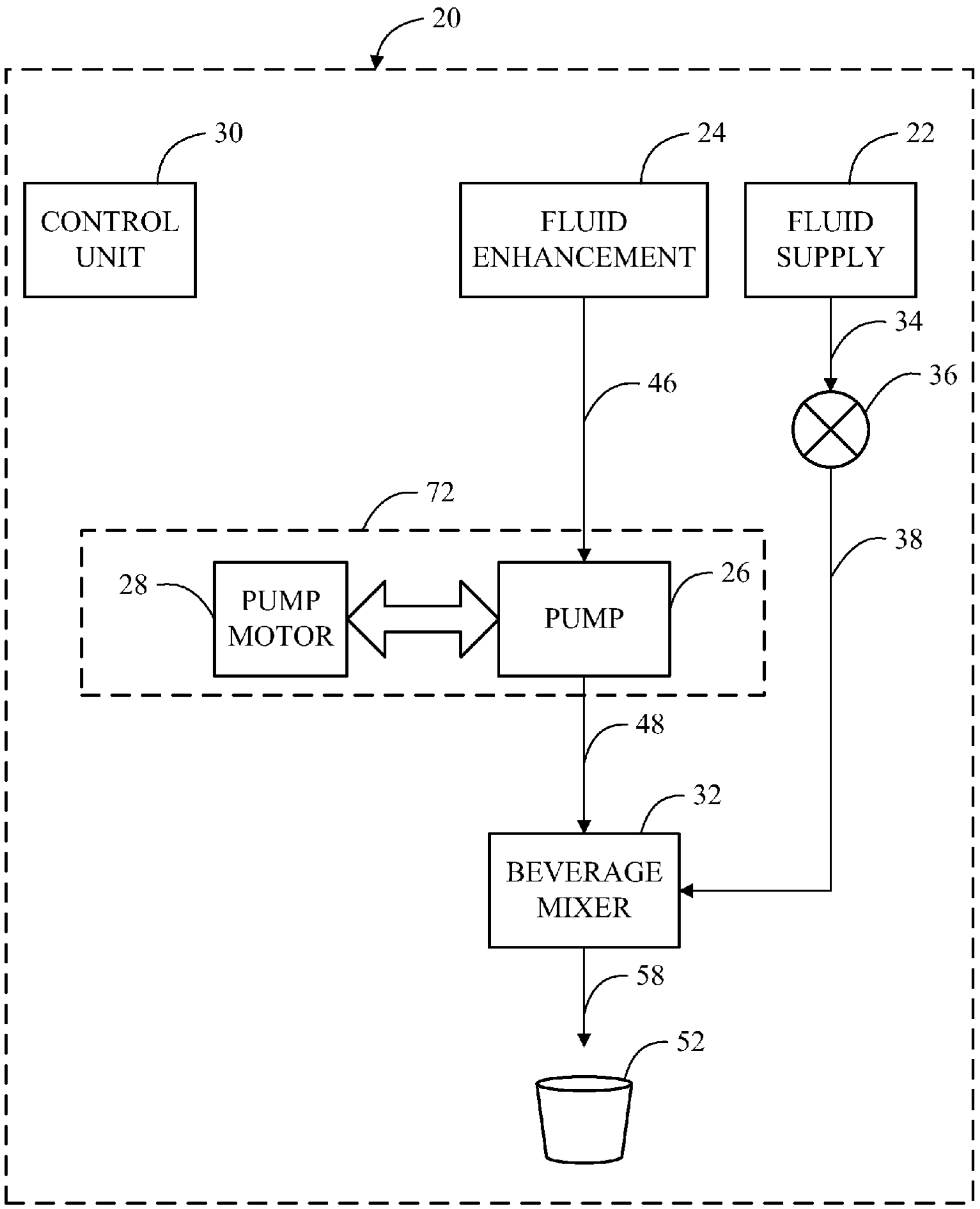
FIG. 2 is a schematic representation of the refrigerator beverage dispenser.

FIG. 2 illustrates a first embodiment which shows the beverage dispenser 20 and associated components for beverage dispensing. The beverage dispenser 20 includes a fluid supply 22 and a fluid enhancement component 24. The fluid supply 22 is controlled by a valve 36. The fluid supply may supply conditioned or unconditioned fluid, such as, unfiltered fluid, filtered fluid, carbonated fluid, uncarbonated fluid, water, or filtered water. The fluid lines 34 and 38 provide paths to the beverage mixer 32. The fluid enhancement component 24 may be housed within a BIB (bag-in-box), a cartridge, a bottle, or any other type of fluid enhancement container. The fluid enhancement component 24 may connect directly into the pump 26 or via the liquid enhancement line 46 or otherwise. The fluid enhancement component 24 may be drawn through the pump 26. The pump 26 is one component of a pumping mechanism 72. The pumping mechanism 72 also may include a motor 28 which actuates the pump 26 and may also be easily separated from the pump 26. The pump 26 may be easily removed by a consumer. The pump 26 may also be disassembled and cleaned by the consumer either by hand or in a dishwasher. The pump 26 may also be attached to a replaceable cartridge and disposed of or returned and cleaned when the cartridge is refilled. As shown in FIG. 2, the fluid supply 22 and the fluid enhancement component 24 are introduced at a beverage mixer 32 via supply lines 38 and 48, respectively. The fluid and fluid enhancement may then mix an output to a cup 52 via a beverage mixer line 58. The beverage mix line 58 is operatively connected to the nozzle 92, such as shown in FIG. 1. The fluid supply valve 36 and the pumping mechanism 72 may be controlled by the control unit 30 in a manner such that a predetermined ratio of the fluid enhancement from the fluid enhancement component 24 to the fluid from the fluid supply 22 is delivered to the beverage mixer 32. Hence, whenever a beverage is requested via the beverage dispenser 20 user interface, the control unit 30 receives this input request and dispenses the selected beverage.

Figure 3:
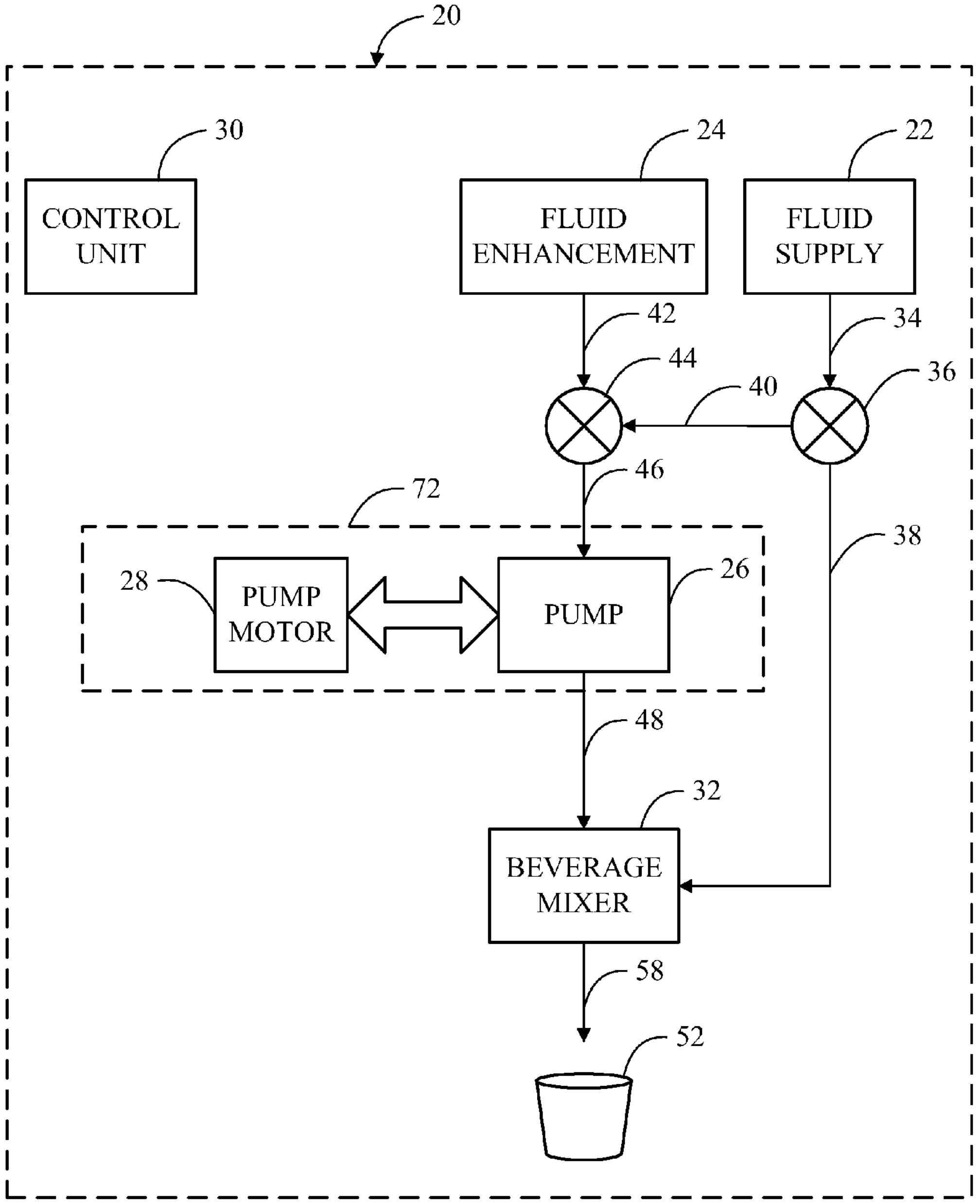
FIG. 3 is a schematic representation of the refrigerator beverage dispenser cleaning system.

FIG. 3 illustrates another embodiment which shows the beverage dispenser 20 and associated components for beverage dispensing. The beverage dispenser 20 includes the fluid supply 22 and the fluid enhancement component 24. The fluid supply 22 is controlled by the valve 36. The fluid lines 34 and 38 provide a path to the beverage mixer 32. The fluid enhancement component 24 may be housed within a BIB (bag-in-box), a cartridge, a bottle, or any other type of fluid enhancement container. The fluid enhancement component 24 flows through the pump 26 and the lines 42, 46 respectively via the valve 44. The fluid enhancement component 24 may connect directly into valve 44 or via the fluid enhancement line 46. The beverage mixing system may utilize a manifold wherein the fluid enhancement component 24, the fluid supply 22, the beverage mixer 32 and the pumping mechanism 72 are interconnected without the use of the various fluid lines. The fluid enhancement component 24 is drawn through the pump 26. The pump 26 is one component of the pumping mechanism 72. Pumping mechanism 72 also has a motor 28 which actuates the pump 26 and also may be easily separated from the pump 26. The pump 26 is designed to be easily removable for replacement. The fluid supply 22 and the fluid enhancement component 24 are introduced at the beverage mixer 32 via the supply lines 38 and 48 respectively. The two fluids are then mixed and output to a cup 52 via a beverage mix line 58. The beverage mix line 58 is mated to the nozzle 92, refer to FIG. 1. The fluid supply valve 36 and the pumping mechanism 72 may be controlled by the control unit 30 in a manner such that a predetermined ratio of the fluid enhancement to fluid is delivered to the beverage mixer 32. Hence, whenever a beverage is requested via the user interface of the beverage dispenser 20, the control unit 30 receives this input request and dispenses the selected beverage. The pumping mechanism 72, and more specifically the pump 26 is cleaned of residue from the fluid enhancement component 24 by flushing the lines 46, 48 and 58 with a small amount of the fluid from the fluid supply 22. The fluid is dispensed into the cup 52 after the initial beverage is mixed. This additional amount of fluid may have a minimum impact on the taste of the mixed beverage. Alternatively, instead of a beverage mixer 32, fluid supply 22 and fluid enhancement 24 may be delivered directly to cup 52.

Figure 4:
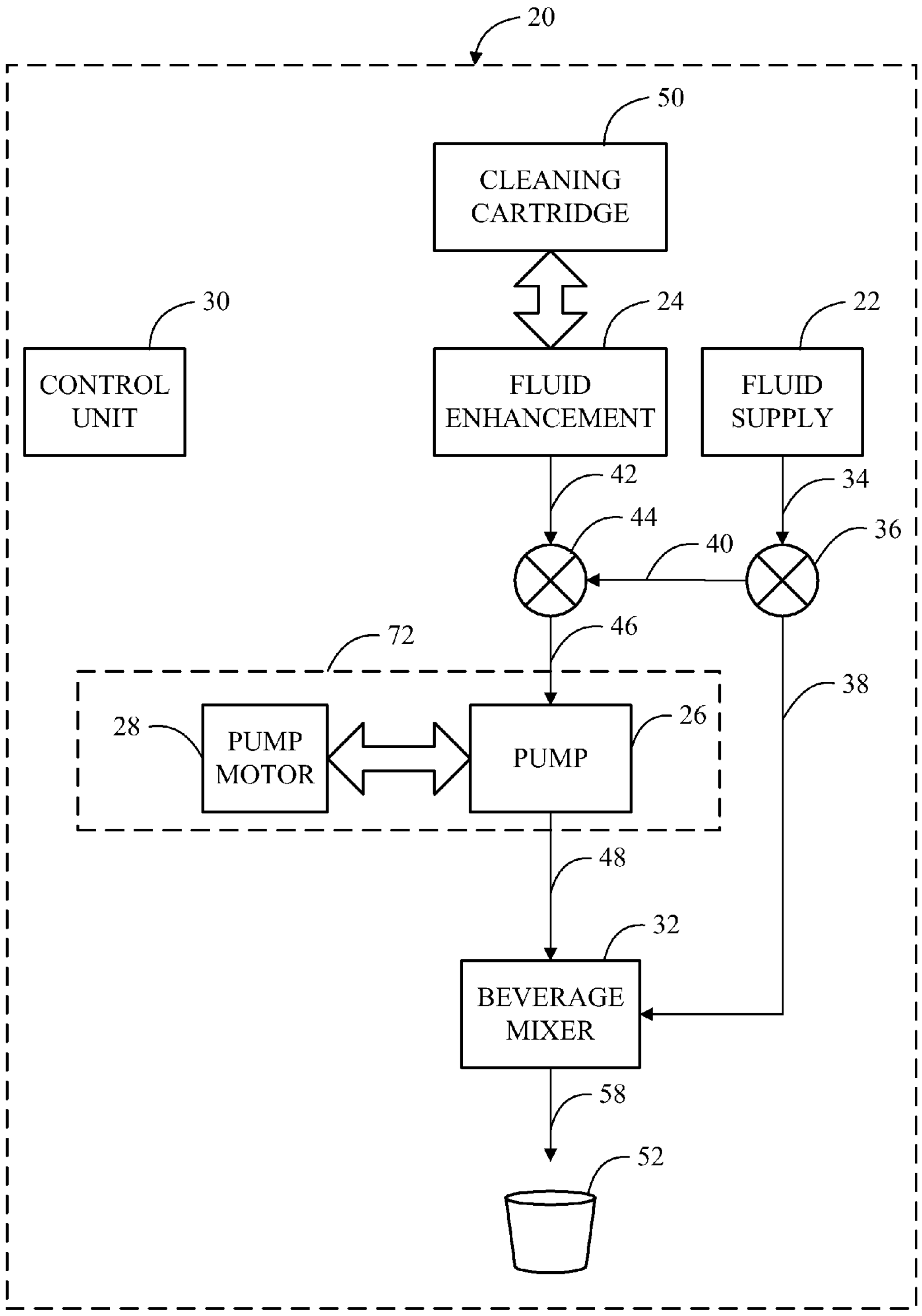
FIG. 4 is a schematic representation of the refrigerator beverage dispenser with a cleaning subsystem.

FIG. 4 illustrates another embodiment wherein a cleaning cartridge or a cleaning subsystem 50 which may be swapped into the same position as the fluid enhancement 24 as they share the same configuration. The pumping mechanism 72, and more specifically the pump 26 may be cleaned of residues from the fluid enhancement component 24 by directing the cleaning solution within the cleaning subsystem 50 through the line 42, the valve 44, and the lines 46 and 48 which are operatively connected to the pump 26. The control unit 30 may then direct the fluid supply 22 to flow through the lines 34, 40, 46, 48 and 58 by actuating the valves 36 and 44, and through the pumping mechanism 72 to rinse all the lines and the pump 26 of the cleaning solution. The control unit 30 may alert the consumer via the beverage dispenser 20 display 86 when the pump 26 should be cleaned or the consumer may independently initiate a cleaning cycle for the pump 26 by pressing the control button 84 associated with initiating a cleaning cycle. In either example, the consumer may place the cup 52 beneath the beverage dispenser nozzle 92 to collect cleaning solution for disposal.

Figure 5:
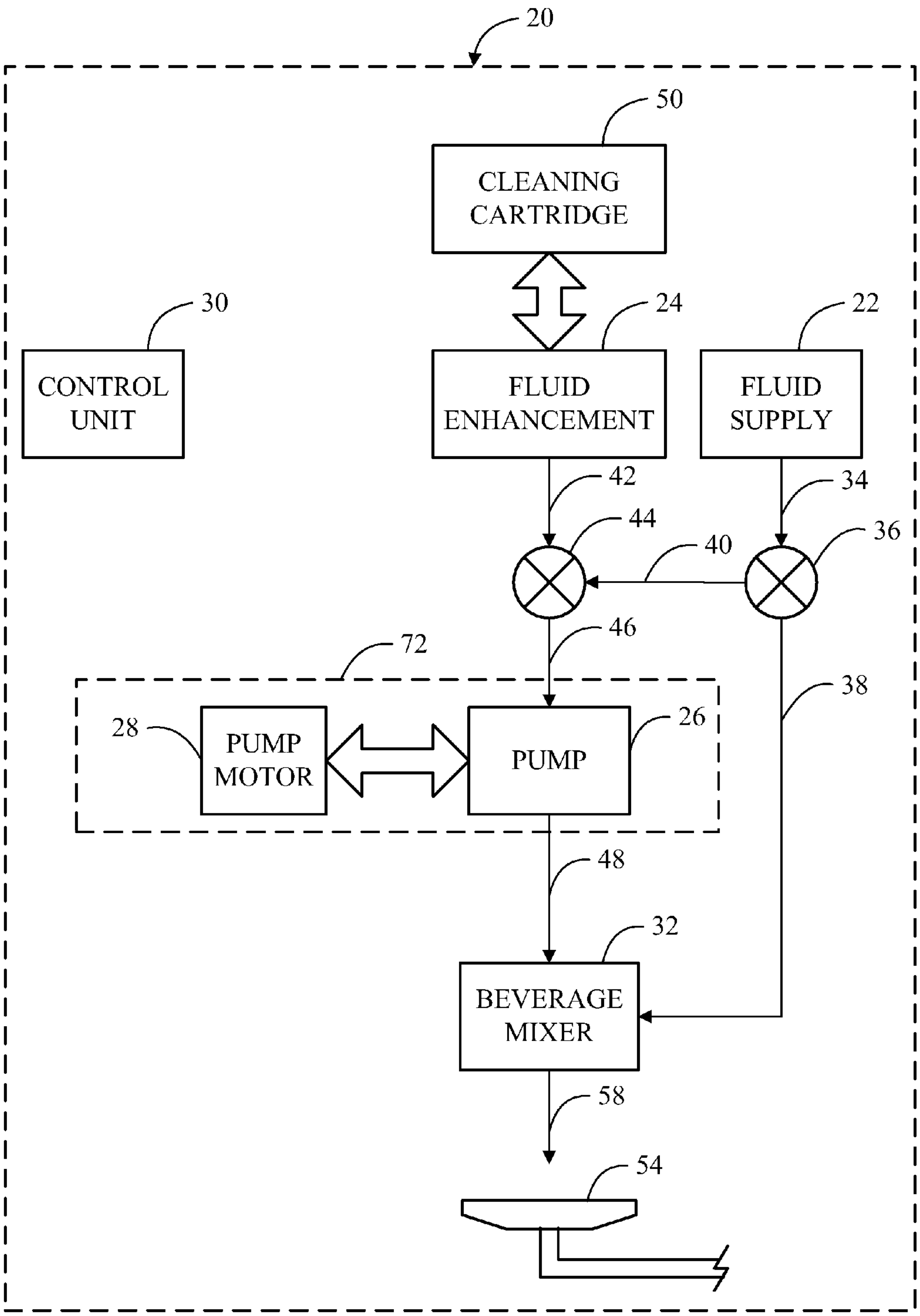
FIG. 5 is a schematic representation of the refrigerator beverage dispenser with a cleaning subsystem and drain.

FIG. 5 illustrates another embodiment wherein a cleaning cartridge 50 or a cleaning subsystem 70 which may be swapped into the same position as the fluid enhancement 24 as they share the same configuration. The pumping mechanism 72 and more specifically the pump 26 may be cleaned of residues from the fluid enhancement component 24 by directing the cleaning solution within the cleaning cartridge 50 through the line 42, the valve 44, and the lines 46 and 48 which are operatively connected to the pump 26. The control unit 30 may then direct the fluid supply 22 to flow through the lines 34, 40, 46, 48 and 58 by actuating the valves 36 and 44, and through the pumping mechanism 72 to rinse all the lines and the pump 26 of the cleaning solution. The control unit 30 may alert the consumer via the beverage dispenser 20 display 86 when the pump 26 should be cleaned or the consumer may independently initiate a cleaning cycle for the pump 26 by pressing the control button 84 associated with initiating a cleaning cycle. In either example, the consumer may allow the cleaning solution to flow directly into a plumbed drain or a non-plumbed drain 54.

Figure 6:
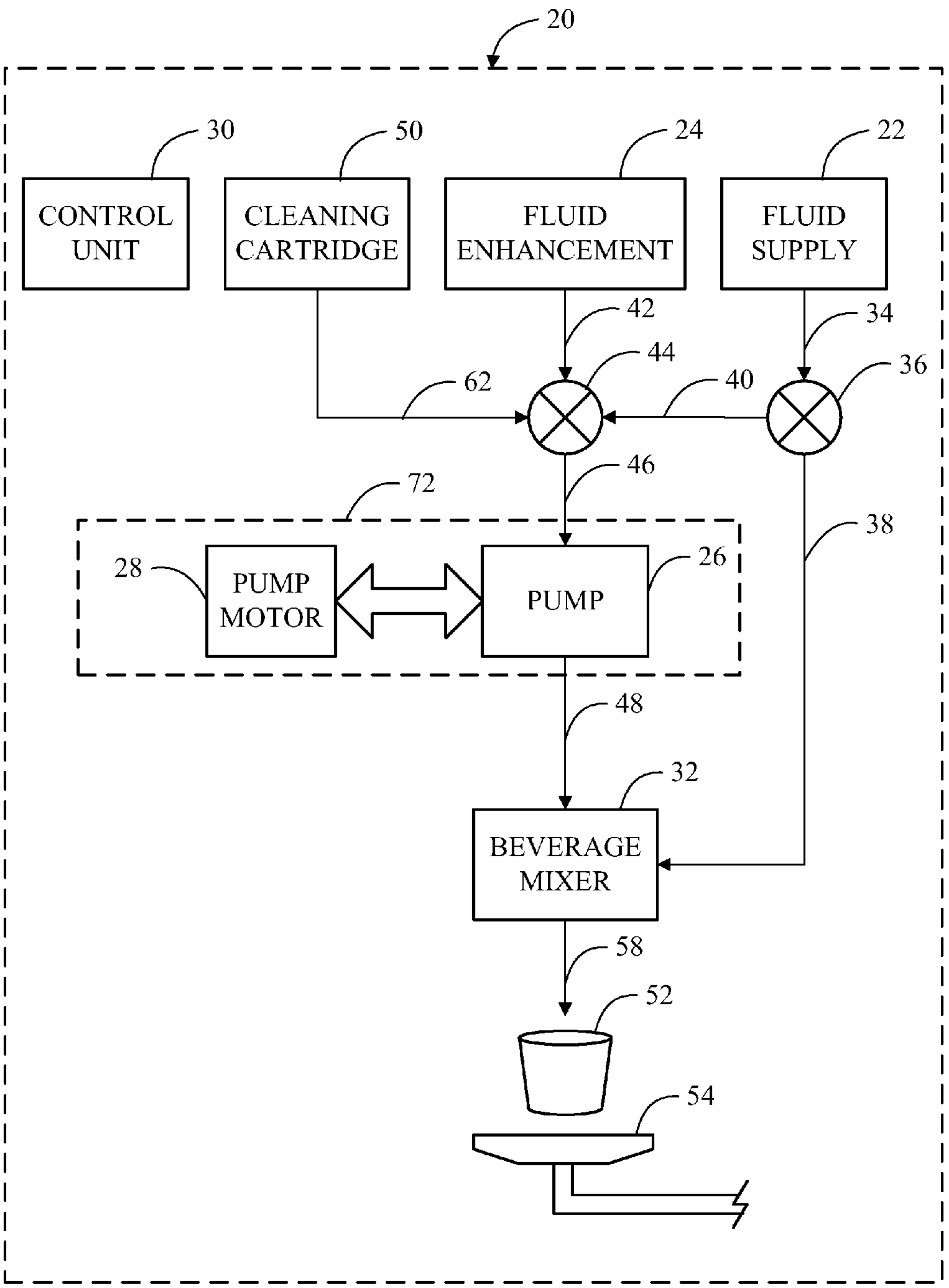
FIG. 6 is a schematic representation of the refrigerator beverage dispenser with a permanent cleaning subsystem and drain.

FIG. 6 illustrates another embodiment wherein a cleaning cartridge 50 or a cleaning subsystem 70 is positioned next to the fluid enhancement component 24 instead of being swapped into and out of the same position as the fluid enhancement component 24, refer to FIG. 5. The pumping mechanism 72 and more specifically the pump 26 may be cleaned of residues from the fluid enhancement component 24 by directing the cleaning solution within the clean cartridge 50 through the line 62, valve 44, line 46, pump 26 and line 48 which feeds beverage mixer 32 and dispenses via line 58. The control unit 30 may then direct the fluid within fluid supply 22 to flow through lines 34, 40, 46, 48 and 58 by actuating valves 36 and 44, and pumping, mechanism 72 to rinse the lines and pump 26 of the cleaning solution. The control unit 30 may alert the consumer via the beverage dispenser display 86 when the pump 26 should be cleaned or the consumer may independently initiate a cleaning cycle for the pump 26 pressing the control button 84 associated with initiating a cleaning cycle. In either example, the consumer may place the cup 52 beneath the beverage dispenser nozzle 92 to collect cleaning solution for disposal. Or a plumbed or non-plumbed drain 54 may be implemented for removing the cleaning solution as opposed to the cup 52.

Figure 7:
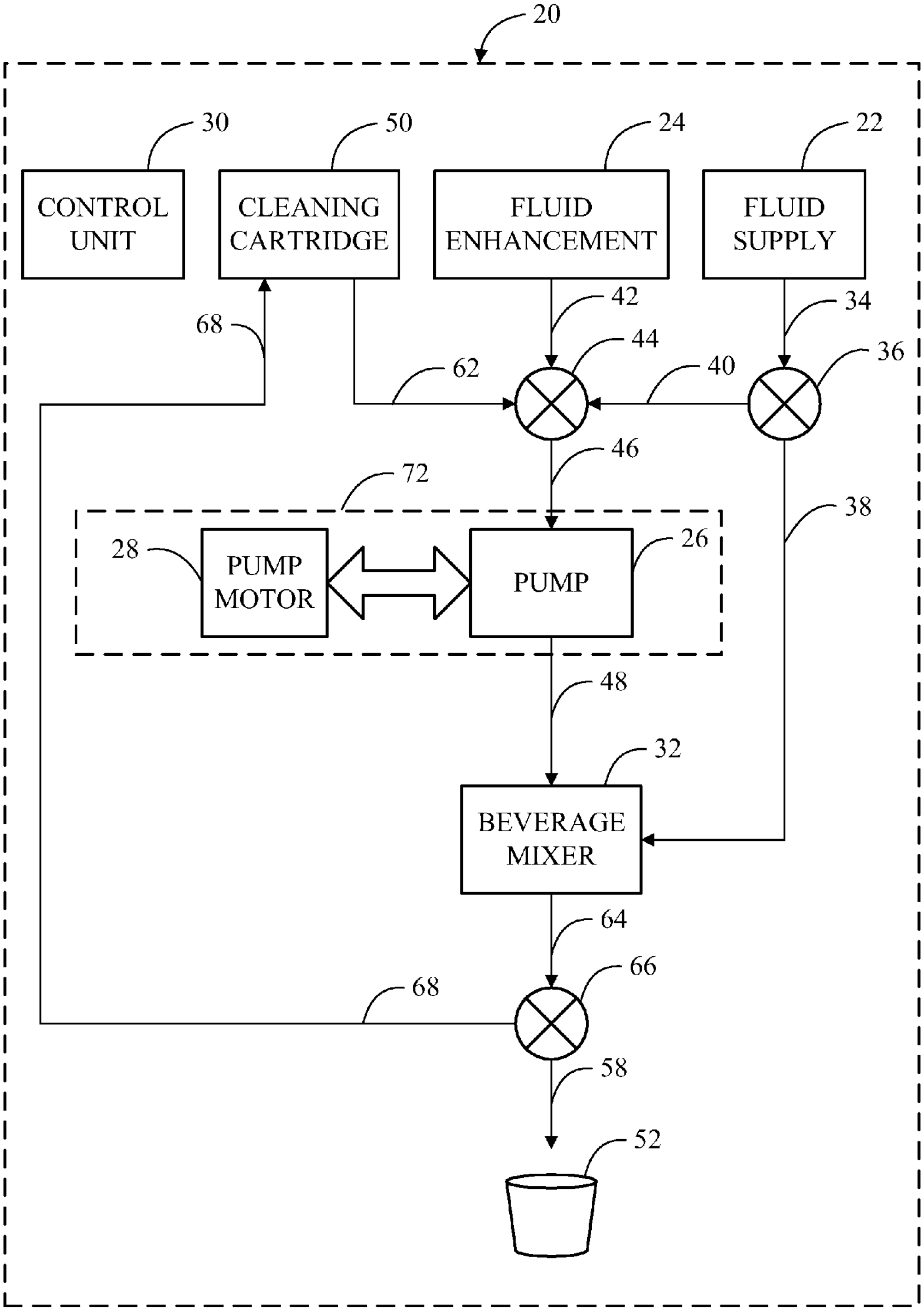
FIG. 7 is a schematic representation of the refrigerator beverage dispenser with a permanent cleaning subsystem.
Figure 8A:
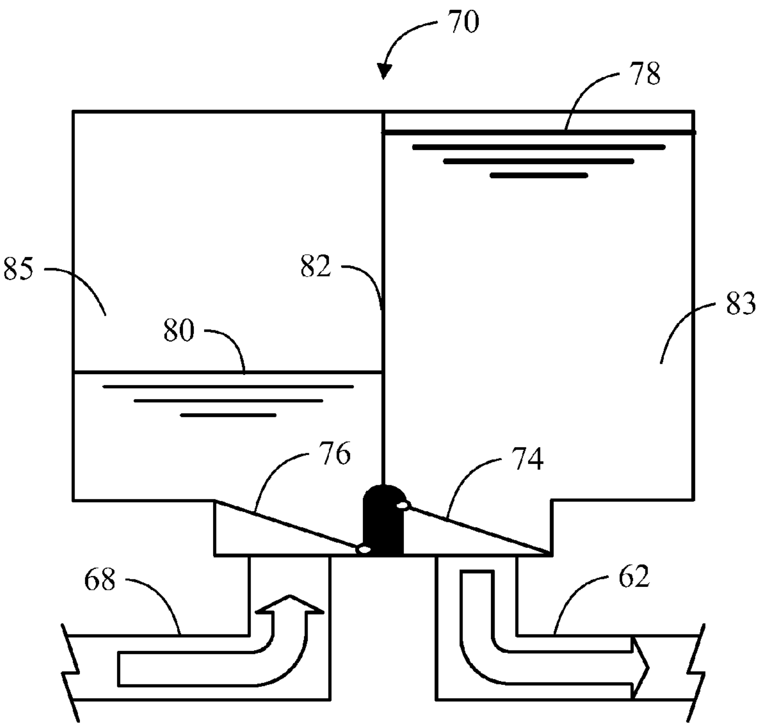
FIGS. 8A-B represent a cleaning cartridge for use in a cleaning subsystem of a beverage dispenser.
Figure 8B:
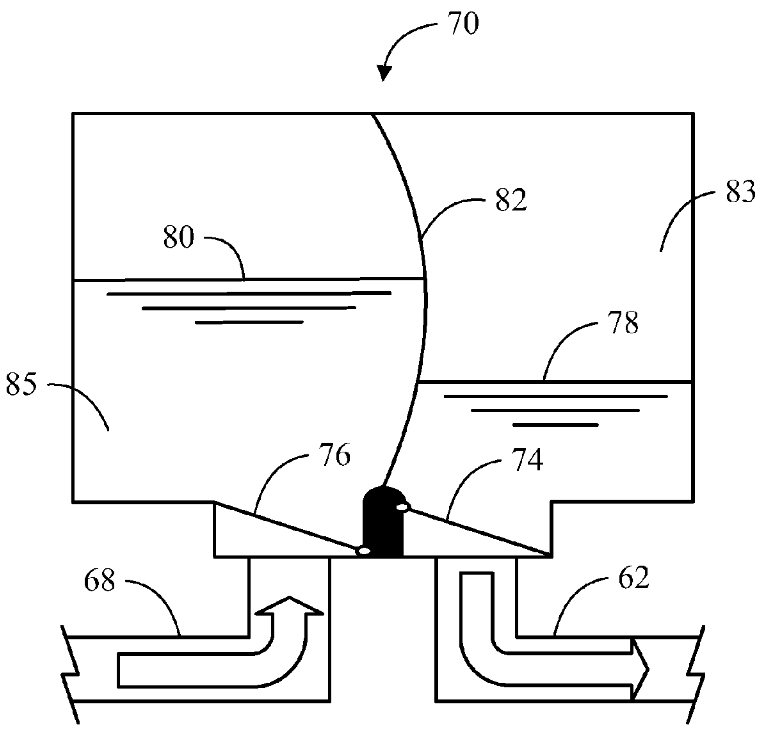

FIG. 7 illustrates another embodiment wherein a cleaning cartridge 50 or a cleaning subsystem 70 is positioned next to the fluid enhancement component 24 instead of being swapped into and out of the same position as the fluid enhancement 24, refer to FIG. 5. Referring to FIG. 8A, a cleaning subsystem 70 contains the unused cleaning solution 78 and the used cleaning solution 80 which are separated by a flexible divider 82 to form a first chamber 83 and a second chamber 85. The cleaning solution 78 from the first chamber 83 enters the beverage dispensing system 20 via a check valve 74 through a line 62. The used cleaning solution 80 returns to the second chamber 85 of the cleaning subsystem 70 through the line 68 via a check valve 76. The pumping mechanism 72, and more specifically the pump 26 may be cleaned of residue from the fluid enhancement component 24 by directing the cleaning solution 78 within the cleaning subsystem 70 through the line 62, the valve 44, the line 46, the pump 26 and the line 48 which feeds the beverage mixer 32 and continues via the line 64 to the valve 66 which directs the flow path to the line 68 and returns the used cleaning solution 80 to the cleaning subsystem 70. The control unit 30 may then direct the fluid within the fluid supply 22 to flow through the lines 34, 40, 46, 48, 64 and 68 by actuating the valves 36, 44, 66 and the pumping mechanism 72 to rinse all the lines and the pump 26 of the cleaning solution 78. The flexible divider 82 may be seen extending due to the inflow of used cleaning solution 80 and the fluid rinse within the area vacated by the unused cleaning solution 78, refer to FIG. 8B. The control unit 30 may alert the consumer via the beverage dispenser display 86 when the pump 26 should be cleaned or the consumer may independently initiate a cleaning cycle for the pump 26 pressing the control button 84 associated with initiating a cleaning cycle.

Thus, a beverage dispenser which provides for easy and convenient cleaning has been disclosed.

The invention has been shown and described above with the preferred embodiments, and it is understood that many modifications, substitutions, and additions may be made which are within the intended spirit and scope of the invention. The present invention is not to be limited to any specific embodiment described herein.

What is claimed is:

1. A refrigerator, the refrigerator comprising:
- a refrigerator cabinet;
- a first compartment disposed within the refrigerator cabinet;
- a second compartment disposed within the refrigerator cabinet;
- a first door providing access to the first compartment;
- a second door providing access to the second compartment;
- a beverage dispensing system operatively connected to the refrigerator cabinet, the beverage dispensing system comprising:
  - (a) a fluid line;
  - (b) a fluid enhancement line;
  - (c) a cleaning subsystem for cleaning out the fluid line and the fluid enhancement line; and
  - (d) a user interface comprising control buttons, wherein one control button initiates a cleaning cycle by the cleaning subsystem;
- wherein the cleaning subsystem further comprises a replaceable cleaning cartridge;
- wherein the replaceable cleaning cartridge contains a cleaning fluid; and
- wherein the replaceable cleaning cartridge contains a first chamber for storing unused cleaning fluid and a second chamber for storing used cleaning fluid.

2. The refrigerator of claim 1 wherein the beverage dispensing system further comprises a mixing chamber configured to receive fluid through the fluid line and fluid enhancement through the fluid enhancement line and to combine the fluid with the fluid enhancement.

3. The refrigerator of claim 2 wherein the fluid enhancement comprises a beverage powder.

4. The refrigerator of claim 2 wherein the fluid enhancement comprises a beverage syrup.

5. A refrigerator, the refrigerator comprising:
- a refrigerator cabinet;
- a first compartment disposed within the refrigerator cabinet;
- a second compartment disposed within the refrigerator cabinet;
- a first door providing access to the first compartment;
- a second door providing access to the second compartment;
- a beverage dispensing system disposed within the cabinet, the beverage dispensing system comprising fluid lines, and syrup or powder lines;
- a cleaning subsystem for cleaning out the fluid lines, and syrup or powder lines; and
- a user interface disposed upon the exterior of the cabinet, the user interface comprising a display and control buttons, wherein one control button initiates a cleaning cycle by the cleaning subsystem;
- wherein the cleaning subsystem further comprises a replaceable cleaning cartridge; and
- wherein the replaceable cleaning cartridge comprises a first chamber for unused cleaning solution and a second chamber for used cleaning solution and wherein the cleaning subsystem is adapted to circulate a portion of the unused cleaning solution from the first chamber through one or more of the fluid lines or syrup or powder lines to the second chamber.

6. The refrigerator of claim 5 wherein the beverage dispensing system further comprises a removably connected diaphragm pump.

7. The refrigerator of claim 5 wherein the cleaning subsystem is adapted to flush the fluid, syrup, or powder lines with each dispensement of a beverage.

8. A method of using a refrigerator with a beverage dispensing system, the method comprising:
- providing a refrigerator having a refrigerator cabinet and a beverage dispenser operatively connected to the refrigerator cabinet, the beverage dispenser comprising a beverage dispensing cleaning system comprising a cleaning cartridge with a first chamber and a second chamber;
- receiving an indicia from a user to dispense a beverage comprising fluid received through a fluid line and fluid enhancement received through a fluid enhancement line;
- dispensing the beverage from the beverage dispenser; and
- circulating a cleaning fluid through the fluid line or the fluid enhancement line for cleaning after dispensing by circulating the cleaning fluid from the first chamber of the cleaning cartridge through the fluid line or the fluid enhancement line and to the second chamber of the cleaning cartridge.

* * * * *